(12) United States Patent
Aylward et al.

(10) Patent No.: US 6,904,926 B2
(45) Date of Patent: Jun. 14, 2005

(54) SYSTEMS AND METHODS FOR COLLECTING AND DISTRIBUTING GRAY WATER

(75) Inventors: Peter G. Aylward, Jamul, CA (US); Joseph A. Casali, San Diego, CA (US); Brandon D. Porter, San Diego, CA (US); Robert G. Perkins, San Diego, CA (US)

(73) Assignee: Southwest Water Resources, L.L.C., San Diego, CA (US)

(*) Notice: Subject to any disclaimer, the term of this patent is extended or adjusted under 35 U.S.C. 154(b) by 113 days.

(21) Appl. No.: 10/616,891

(22) Filed: Jul. 9, 2003

(65) Prior Publication Data

US 2004/0050429 A1 Mar. 18, 2004

Related U.S. Application Data

(60) Provisional application No. 60/319,387, filed on Jul. 10, 2002.

(51) Int. Cl.[7] ............................................... E03C 1/122
(52) U.S. Cl. ........................ 137/119.01; 4/665; 137/597
(58) Field of Search ........................... 137/119.01, 597, 137/2; 4/665

(56) References Cited

U.S. PATENT DOCUMENTS

| | | | |
|---|---|---|---|
| 3,915,857 A | | 10/1975 | Olson |
| 4,112,972 A | * | 9/1978 | Lajeuness .................... 137/597 |
| 4,162,218 A | * | 7/1979 | McCormick ................... 4/665 |
| 4,180,088 A | | 12/1979 | Mallett |
| 4,228,006 A | | 10/1980 | Hanna |
| 4,705,060 A | | 11/1987 | Goulbourne |
| 5,099,874 A | | 3/1992 | Della Cave |
| 5,106,493 A | | 4/1992 | McIntosh |
| 5,117,660 A | | 6/1992 | Downs et al. |
| 5,147,532 A | | 9/1992 | Leek, Jr. |
| 5,173,180 A | | 12/1992 | Stewart et al. |
| 5,192,426 A | | 3/1993 | DeCoster et al. |
| 5,210,886 A | | 5/1993 | Coe, III |
| 5,217,042 A | | 6/1993 | Della Cave |
| 5,217,323 A | | 6/1993 | Bilson |
| 5,243,719 A | | 9/1993 | McDonald et al. |
| 5,248,416 A | | 9/1993 | Howard, Jr. |
| 5,251,346 A | | 10/1993 | Donati |
| 5,262,047 A | | 11/1993 | Benskin et al. |
| 5,288,412 A | | 2/1994 | Voorhees et al. |
| 5,303,728 A | | 4/1994 | Senatore |
| 5,317,766 A | | 6/1994 | McDonald et al. |
| 5,322,623 A | | 6/1994 | Benskin et al. |
| 5,403,498 A | | 4/1995 | Morrissey et al. |
| 5,406,657 A | | 4/1995 | Donati |
| 5,409,616 A | | 4/1995 | Garbutt et al. |
| 5,452,956 A | | 9/1995 | Gilliam |
| 5,498,330 A | | 3/1996 | Delle Cave |
| 6,132,138 A | * | 10/2000 | Haese .......................... 405/37 |
| 6,139,729 A | | 10/2000 | Gonzalez, Jr. |
| 6,282,733 B1 | | 9/2001 | Gonzalez, Jr. |

FOREIGN PATENT DOCUMENTS

| | | | |
|---|---|---|---|
| GB | 2250770 | * | 6/1992 |
| GB | 231 4580 | | 1/1998 |

* cited by examiner

*Primary Examiner*—Stephen M. Hepperle
(74) *Attorney, Agent, or Firm*—Clifford B. Perry; Heidi L. Elsenhut

(57) ABSTRACT

A gray water collection and distribution system includes a main drain line, one or more black water sources connected to the main drain line, one or more gray water sources connected to the main drain line and a collection valve located down stream from at least one of the one or more black water sources. The collection valve includes an inlet connected to the main drain line, and an outlet connectable which can be switched to either a black water drain line or a gray water drain line, depending upon which type of water flow is detected.

18 Claims, 7 Drawing Sheets

SYSTEMS AND METHODS FOR COLLECTING AND DISTRIBUTING GRAY WATER

CROSS REFERENCE TO RELATED APPLICATIONS

This application claims the benefit of U.S. Provisional Application No. 60/319,387 filed Jul. 10, 2002, and entitled "Gray Water Reclamation System," the contents of which are herein incorporated by reference in its entirety for all purposes.

BACKGROUND

The present invention relates to water reclamation systems, and in particular to gray water reclamation systems.

As known in the art, "gray" water refers to water containing low levels of contaminants and which is typically not potable, but can be recycled and used in particular applications, such as irrigation water, toilet water, as well as some industrial applications. "Black" water is distinguished from gray water in that black water contains a high amount of particulates and/or contaminants which requires heavy water treatment. Fresh or "white" water is water which is most commonly used by people for drinking and cooking.

While fresh water is absolutely essential for life, it has become a diminishing resource around the world. As populations in arid areas continue to expand, drought conditions affect wide spread areas, and pollution from factories and plants contaminate water reserves, fresh water is becoming more difficult to obtain, and increasingly expensive when it is possible to do so. In certain areas around the globe, fresh water has been completely exhausted or contaminated, and this trend is expected to become more pervasive in larger and more industrial areas.

Gray water reclamation has been a central point in proposed approaches to conserve fresh water resources. Many of these approaches have been guided by the fact that gray water and black water are often produced by different sources within the same system (e.g., in a residential plumbing system gray water collected from a shower and black water collected from a kitchen garbage disposal), and have thus attempted to meet the needs of such a system by separately plumbing the collection systems of the black and gray water sources. This approach is exceedingly expensive to implement, as two separate drainage systems under such an approach would need to be installed and maintained. Retrofitting an existing plumbing systems would be even more expensive, if it is possible to do so at all.

Others have anticipated these problems, and have proposed a somewhat more shared system in which gray and black water are collected. In one approach, U.S. Pat. Nos. 5,217,042 and 5,498,330 propose using the same footprint of an existing plumbing line to plumb a two-in-one drain line. This approach suffers from some of the aforementioned difficulties, in that extensive retrofitting of the single drain line to a two-in-one drain line is required. Further, the resulting black and gray water drain lines are significantly reduced in their respective diameters, leading possibly to an increased number of blocks, and maintenance time and expense. In another of these approaches described in U.S. Pat. No. 4,112,972, an upstream portion of the drain line is used to collect gray water, and a downstream portion is used to collect black water. This approach is limited to those structures in which black water sources are located down stream from gray water sources, an arrangement which is not feasible for most structures, given the number of different black water sources and their varied locations throughout the structure.

What is therefore needed is an improved gray water system which can be implemented in most existing structures without extensive retrofitting.

SUMMARY OF THE INVENTION

The present invention provides systems and methods for collecting and distributing gray water using an existing plumbing structure which can be implemented in most structures. In a particular embodiment, the system includes the existing drain line to which one or more black and gray water sources are connected. The system further includes a collection valve located down stream from at least one of the black water sources, the collection valve having (i) an inlet connected to the main drain line, and (ii) an outlet connectable to a black water drain line (e.g., the sewer main or septic tank line) or a gray water drain line. When flow from a gray water source is sensed, the collection valve switches or remains switched to the gray water drain line where it is filtered and processed for reuse. When flow from a black water source is sensed, the outlet of the collection valve switches, or remains switched to the black water drain line.

These and other features of the invention will be better understood when viewed in light of the following drawings.

DETAILED DESCRIPTION OF SPECIFIC EMBODIMENTS

System Overview

Figure 1:
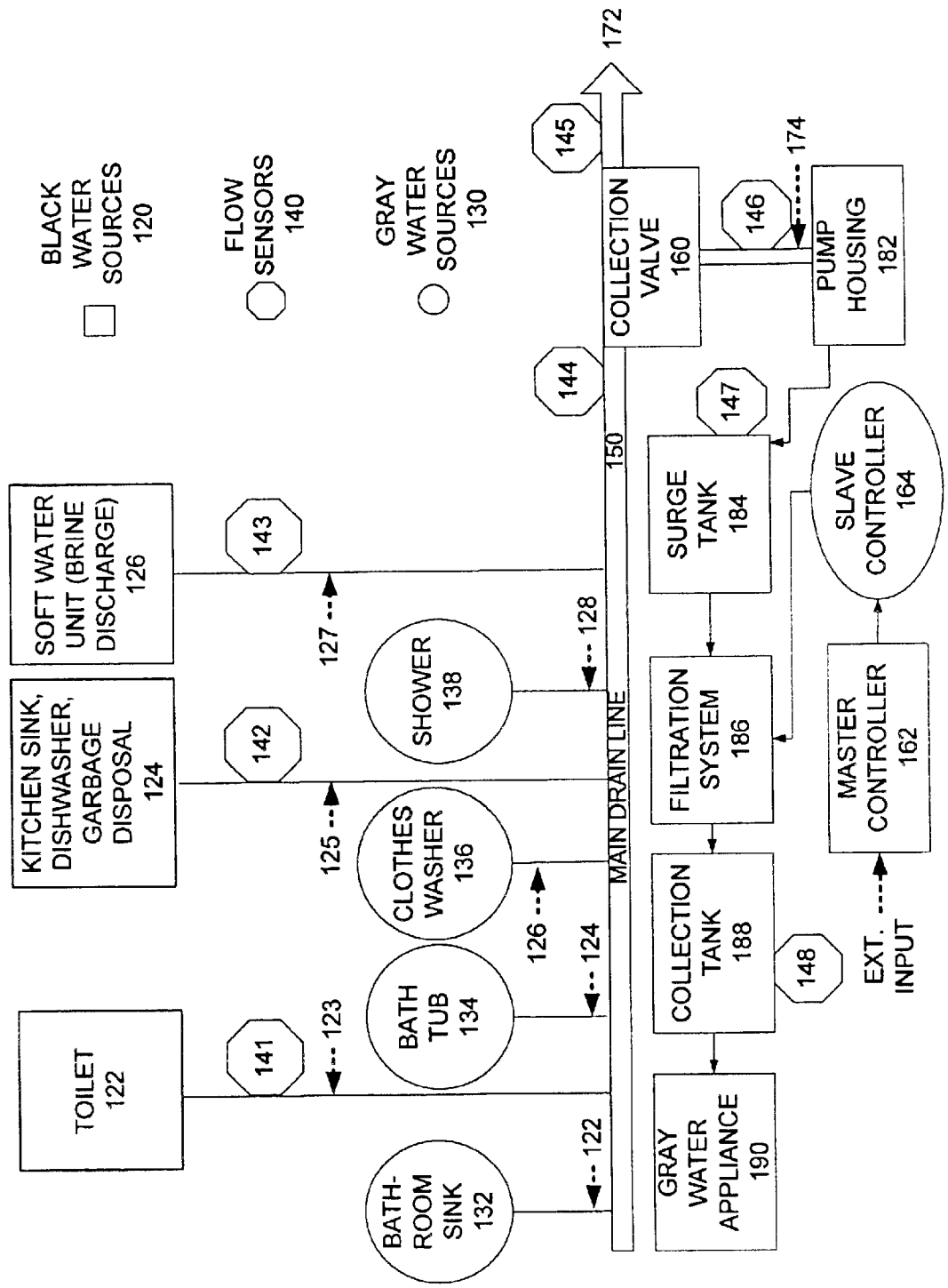
FIG. 1 illustrates a gray water reclamation system 100 in accordance with one embodiment of the present invention.

FIG. 1 illustrates a gray water reclamation system 100 in accordance with one embodiment of the present invention. The system 100 includes "black" water sources 120, "gray" water sources 130, flow sensors 140, an existing main interior drain line 150, a collection valve 160, pump housing 182, a surge tank 184, filtration system 186, an optional gray water collection tank 188, and the gray water appliance 190. The black water sources 120 include a toilet 122, a kitchen sink in line with the garbage disposal 124, and a water softening unit which produces brine 126. Gray water sources include a bathroom sink 132, bathtub 134, clothes washer 136, and shower 138.

As illustrated in FIG. 1, both the black and gray water sources drain to a main drain line 150 which connects to a collection valve 160. The collection valve 160 directs the drain flow to either a black water drain line 172 (e.g., an existing exterior sewer line or drain line to septic tank), or to a gray water drain line 174. The collected gray water can then be distributed to the gray water appliance(s) 190. In a particular embodiment of the invention, the gray water appliance 190 is an irrigating system, such as a sub-surface irrigation system. In another embodiment, the gray water appliance is a toilet which reuses the gray water. In still another embodiment, the gray water appliance is a carwash system, or some such other industrial application which can operate with gray water. Those skilled in the art will appreciate that the invention may be used with any appliance which can operate using gray water.

The system 100 of the present invention further includes flow sensors 140 which are configured to detect water flow. As shown, flow sensors 141–143 are positioned to detect water flow in the black water drain lines 123, 125 and 127 of the respective black water sources 122, 124 and 126. As used herein the term "black water event" refers to the discharge of water from a black water source. As the flow sensors 141–143 are located on black water drain lines 123, 125 and 127, they are referred to as "black water sensors." In an alternative embodiment of the invention, flow sensors are located on the gray water drain lines 122, 124, 126, and 128 to detect a "gray water event" (i.e., the discharge of water from a gray water source), and as such will be referred to as "gray water sensors." Further alternatively, the system 100 may include both black and gray water sensors, i.e., at least one sensor on a black water line and one sensor on a gray water line. As used herein, the term "flow event" refers to the detection of water flow from either a black or gray water source.

The flow sensors 140 further include a collection valve inlet sensor 144 configured to sense water flowing along the main drain line 150 into the collection valve 160, black and gray water drain line sensors 145 and 146, respectively, configured to sense water flow in the black and gray water drain lines 172 and 174, respectively. In a specific embodiment shown and described below, the sensors 140 also include a radio transmitter operable to communicate event signals to the system to inform it of water flow detection. When so configured, the black water sensors are operable to transmit "black water event signals," the gray water sensors are operable to transmit "gray water event signals," and the collection valve sensor 144 is operable to transmit a "water flow event signal." Any type of sensor may be selected to detect water flow or a lack of capacity in the storage system, for example, using mechanical, optical, or electronic sensors, or sensors implementing a combination of these technologies. Further, in addition to detecting water flow, the sensors 140 may be configured to detect flow rate, volume, temperature and other parameters. The invention is not limited to the use of any particular sensor technology, and other sensing means may be used in alternative embodiments within the present invention. A specific embodiment of the flow sensor 140 is shown and described in further detail below.

Drain line 150 connects to each of the black and gray water sources 120 and 130 and terminates downstream at the inlet of the collection valve 160. In a particular embodiment, drain line 150 is the existing structure's drain line which is spliced to add the collection valve 160. In another embodiment, drain line 150 is installed (either upon removal of the previous line, or in the original construction of the structure) to provide a common black and gray water drain line to the collection valve inlet. The drain line 150 may be constructed from any material such as iron, copper, brass, PVC, ABS and/or other material which is most suitable and/or approved by regulation.

The collection valve 160 is operable to connect the main drain line 150 to either the black water drain line 172 or the gray water drain line 174, referred to herein as the collection valve's "states." In a particular embodiment, the collection valve's default and failsafe operating condition is the black water state in which the valve's output is connected to the black water drain line 172.

In one embodiment of the invention, a master controller 162 and slave controller 164 are used to control the central functions of the system 100. Specifically, the master controller 162 is operable to communicate with the sensors 140, and in response, provide instructions to the slave controller 164. Responsive to the instructions, slave controller 164 controls the collection valve 160, pump housing 182 and filtration system 186 to operate in the desired state. In a particular embodiment, the master controller 162 is configured to communicate wirelessly to sensors 140, although one or more of the sensors may be hardwired connected to the master controller 162 in alternative embodiments. The master controller 162 may also include a port for receiving external commands such as a shut down command from the user/operator. A description of the master controller 162 and slave controller 164 are provided in FIGS. 3A and 3B, below.

In a particular embodiment, each of the flow sensors 140 operates wirelessly to communicate with the master controller 162. In one embodiment, the transmitted signals consist of wireless signals such as those operating within the unlicensed ISM (industrial, scientific and medical) frequency band, and/or signals defined by conventionally-known standards such as "BlueTooth" or IEEE 802.11. Further preferably, each transmitted signal is unique in order to determine the corresponding transmitter's identity. Some or all of aforementioned features may also be implemented in a hardwired system in which each sensor is hardwired to the master controller 162. Other communication means, such as optical or mechanical, may be used to transmit the sensor signals to the collection valve 160.

The system 100 further includes a pump housing 182 configured to supply the collected gray water to the surge tank 184. In one system embodiment, one or more components of the gray water collection and distribution system 184, 186 and 190 are located above the main drain line (e.g., when the main drain line is underground and the surge tank or filtration system is located above ground for ease of servicing). In such an embodiment, pump housing 182 operates to supply the collected gray water to the surge tank and/or other above ground system components. In other embodiments in which the gray water components 184, 186 and 190 are located below the main drain line (e.g., where the main drain line is a drain pipe in the ceiling of a multi-story residence), the collected gray water may be gravity feed to the gray water components 184, 186 and 190, and the pump housing 182 may be omitted.

The surge tank 184 is operable to contain a large volume of water which may enter the system from sources such as the bathtub 136 or clothes washer 138. The surge tank 184 is sized to accommodate the largest expected volume of water, and may be located above ground to facilitate unit servicing and monitoring. In a specific embodiment, the surge tank 184 includes filtering means to remove particulates which would otherwise settle in the bottom of the surge tank 184. Further specifically, the surge tank 184 may include components and features such as air vents, overflow port, drain port, cleaning/access port, etc., which are requested or required by regulatory bodies governing the use of such a system. The apparatus and/or function of surge tank 184 may be incorporated into the pump housing 182 or filtration system 186 in alternative embodiments. In the embodiment as illustrated, the surge tank 184 includes a sensor 147 configured send a signal to the master controller 162 when the volume or level of the surge tank 186 reaches a predefined point. Water is then either pumped or gravity fed from the surge tank 182 to the filtration system 186.

The filtration system 186 provides the system's primary gray water filtering to reduce the particulates and contaminants in the gray water to an acceptable level and remove particles which could potentially clog the gray water appliance 190. The filtration system 186 may also provide dis-infection treatment options, such as UV radiation, ozonation, chlorination, enzyme treatment, or other chemical means, to meet site-specific needs. The degree of filtration and/or dis-infection treatment may be adjusted to comply with regulatory requirements, the operator's wishes, or other considerations. The filtered gray water is then supplied either by pump or gravity feed to the gray water collection tank 188 which stores the filtered/disinfected gray water until needed by the gray water appliance 190. The collection tank 188 may include a pump or other such apparatus to supply the gray water to the gray water appliance 190, or the pump may be omitted when the gray water appliance can be gravity-fed, or when the gray water appliance 190 itself incorporates a pump. In some embodiments, for example, in a constantly-fed watering sub-surface irrigation system, the storage tank is not needed as the collected gray water is used as it is produced. In such an embodiment, the pump housing 182 and/or the surge tank 184 will have sufficient capacity to hold the volume of water which is in excess of that taken up by the gray water appliance 190.

The gray water appliance 190 may be any watering apparatus which is approved for gray water usage. In one embodiment, the gray water appliance is an irrigation system (above ground or sub-surface) for providing water to grass, shrubs, plants, vegetation, and/or trees. In another embodiment, the gray water appliance 190 comprises a toilet fixture. In still another embodiment, the gray water appliance is a car washing apparatus. The reader will appreciate that these appliances are only exemplary and that numerous others may be used in alternative embodiments under the present invention.

Figure 2:
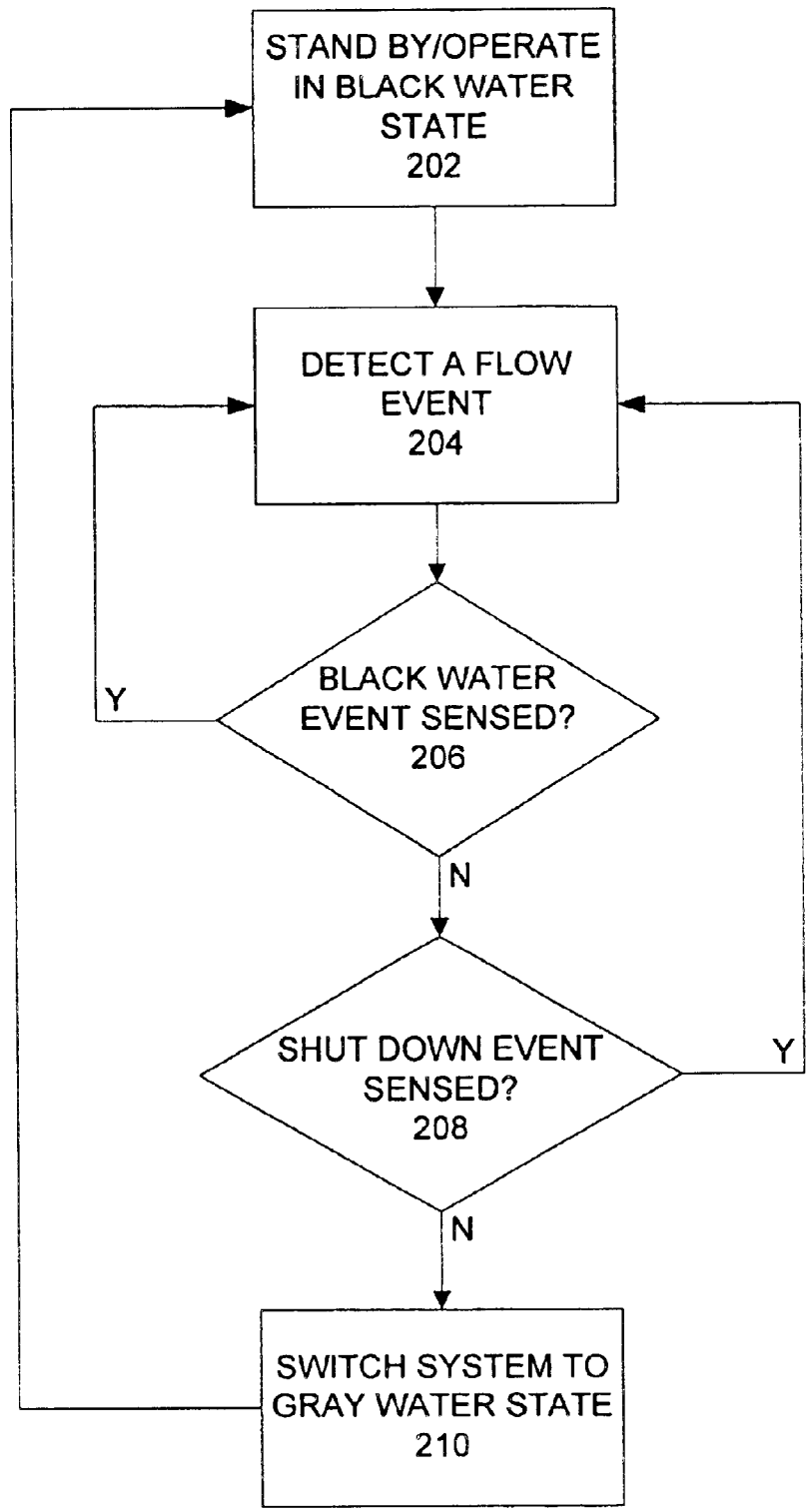
FIG. 2 illustrates a method for operating the gray water collection and distribution system shown in FIG. 1.

FIG. 2 illustrates a method for operating the gray water collection and distribution system 100 in accordance with one embodiment of the present invention. Initially at 202, the system 100 stands by in a black water state, in which the outlet of the collection valve 160 is switched to the black water drain line 172. Next at 204, water flow into the collection valve 160 is detected by sensor 144. Next at 206, a determination is made as to whether a black water event has been sensed. If so, the process returns to 202 where the system continues operating in the black water state. If not, the process continues at 208, where a determination is made as to whether a shut off event has been sensed. A "shut off event" may be a system condition which impairs or prevents the safe collection of gray water, for instance, the overcapacity of gray water presently in the surge or collection tanks 184 or 188, a power failure, or a clog which is sensed in a black water source 122, 124, or 128. In addition, the operator may also initiate a "shut off event" externally, for instance, by depressing a manual shut off switch. Manually shutting off the system may be desired when the operator is using one of the gray water sources to handle a black water task, for example, using a sink to wash diapers, etc.

If a shut off event is not sensed, the process continues at 210, where the system is switched to a gray water state. In this state, the master controller 162 provides one or more instructions to the slave controller 164 to switch the output of the collection valve to the gray water drain line 174, and to begin operation of the pump and filtration systems 182, 184, and 186 in order to process the gray water and supply it to the collection tank 188. Sensor 146 monitors the flow of the collected gray water and may inform the master controller 162 when flow has stopped, the master controller 162 subsequently instructing the slave controller to discontinue operation of the pump and filtration systems 182, 184 and 186. The process then returns to 202 where the system is switched to a black water state and the outlet of the collection valve 160 returns to the black water drain line 172.

FIG. 2 illustrates only one exemplary embodiment of the system in which water flow is detected and several others will become apparent to the reader. For example, sensors could be located on one or more of the gray water sources, and the system could change to a gray water state whenever (i) a gray water event was communicated and (ii) no black water events were communicated (assuming that no shut off events occurred). This represents only one of the possible variations which can be implemented in alternative embodiments under the present invention.

Figure 3A:
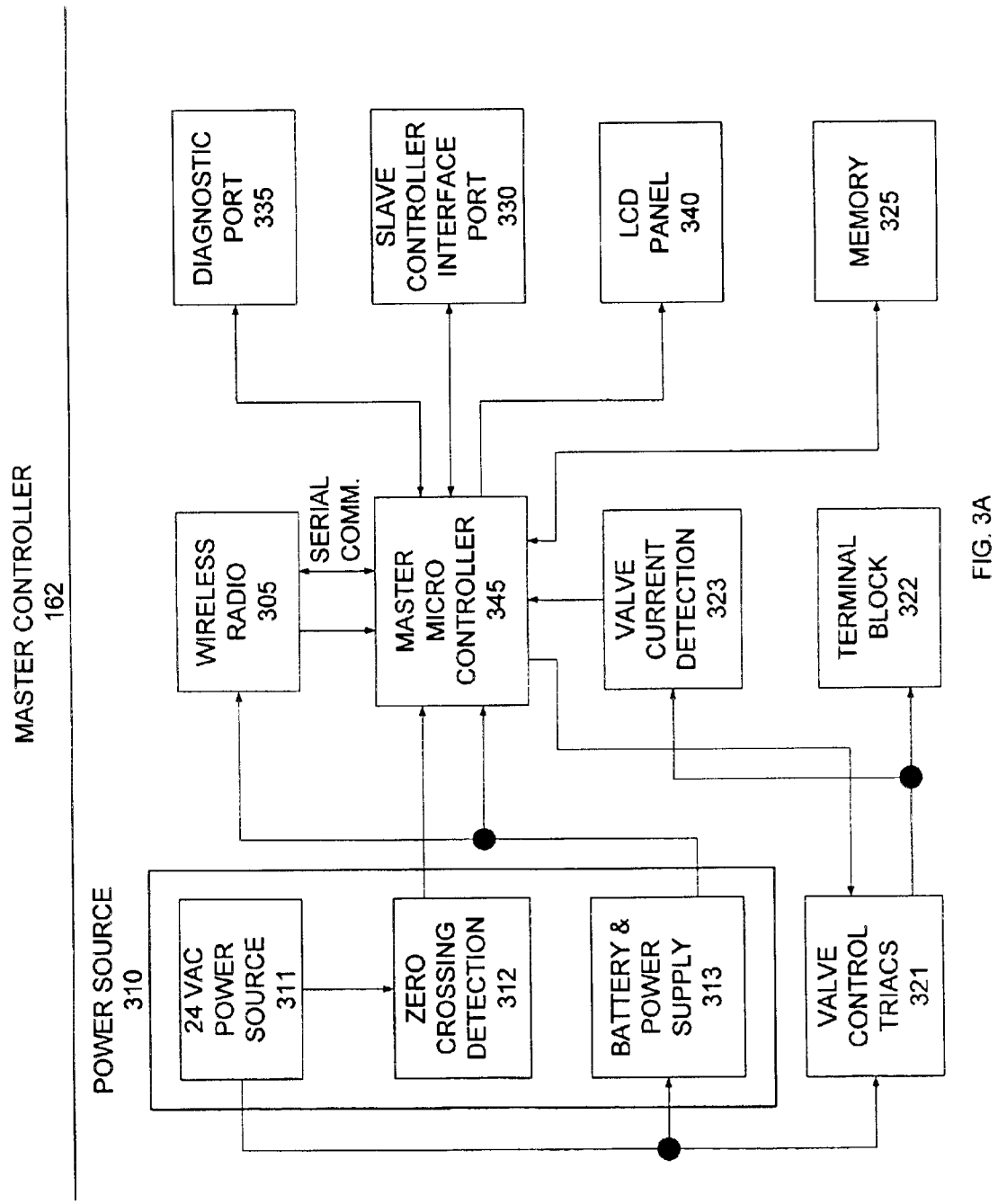
FIG. 3A illustrates one embodiment of the master controller shown in FIG. 1.

FIG. 3A illustrates one embodiment of the master controller 162 shown in FIG. 1, configured to control a sub-surface irrigation system 190. In this embodiment, the master controller controls the operation and/or gathers status from the black water sensors 141–143, the slave controller 164, and the gray water appliance 190 comprising an irrigation system.

The master controller 162 includes a wireless radio 305 with RSSI (signal strength) output, a power supply section 310 comprising a 24 volts AC power source 311, AC power zero crossing detection 312, and power supply with backup battery 313, irrigation valve control triacs 321 with terminal block 322, valve current detection 323, on-board memory 325, slave controller port (if connected with optically isolated cable versus wireless) 330, a diagnostic port 335 for firmware upgrades and system calibration during installation, user interface which includes LCD panel 340 and push button selection switches (not shown), and the micro-controller (uC) 345. This block executes instructions via flash based firmware to control the interaction between the sensors, slave controller, user selections via user interface, watering/irrigation cycles and the detection of errors within the system along with the indication of these errors and/or system status.

The wireless radio 305 is an attachable circuit board with a RF transceiver, support circuitry for filtering and frequency control logistics, digital control interface for programming the transceiver by the uC 345 along with controlling the transmit versus receive sections, phase lock loop status, and received signal strength indication (RSSI) output that will be read by the uC 345 during reception of RF traffic for determination of validity. The 24 VAC wall power 311 and/or backup battery 313 are used to supply power to the voltage regulator which produces the operating voltage used by a majority of the digital circuitry and the wireless radio. The AC voltage is rectified prior to the regulator to produce raw DC volts. Both voltage sources are diode connected for isolation between the power sources and allow reading of the individual voltages by the uC 345 for system diagnostics.

AC zero crossing detection 312 is used by the controller to determine whether the power source 310 is connected and/or supplying power. The system also uses this circuit to determine the frequency of the power source along with controlling the triacs 321 during the low voltage phase of the cycle for less inductive power reflection and/or surge. The irrigation valves of the irrigation system 190 (also called stations) are controlled via triacs connected to the uC. The stations are connected to the controller via the terminal block 322.

During station run time, the valves draw a nominal amount of current. This current is read by the uC 345 via the valve current detection circuit 323 and determined to be within specification or not. If drawing excess current, the station is turned off and the diagnostic system error is logged. If no stations are enabled and current flow is detected, this also causes an error to be logged.

The diagnostic port 335 is used by the installation personnel to get flow calibration data in and out of the system, update the firmware in the flash based uC 345, enter sensor identity information, and for general data gathering during the installation or calibration phases.

The slave controller communicates with the master controller via the interface port 330. The interface port 330 may comprise a channel when the master and slave controllers are communicating wirelessly, or it may comprise a electrical or optical connection when electronic or optical signal means are used. In a particular embodiment, the master controller user interface consists of a LCD panel 340 and pushbutton switches (not shown). This block allows the user to program various features within the controller for irrigation, sensor control/status, error logging/status, along with any other functions that allow the user access to the system.

In a particular embodiment, the uC 345 is connected to a Flash type memory which is designed to be upgraded/updated in the field via the diagnostic port. It also has EEPROM 325 memory to store system parameters which is non-volatile and is used by the firmware for system control. It also has an A/D converter section used for valve current readings along with determining battery and pre-regulator voltage values.

For additional functionality and reliability, the master controller 162 sends a signal to each black water sensor 141–143 to check its "health." In such an embodiment, each sensor responds correctly to the health check, or the master controller 162 provides an instruction to the slave controller 164 to operate in a black water state and to issuing an "alarm" to inform the operator of a non-compliant system condition. For example, if a sensor battery is low, the system 100 will not collect gray water until the battery is replaced or recharged. This prevents problems from power failures, low batteries, and sensor or radio malfunctions. The Controller also controls other elements of the System such as irrigation valve(s), pump(s), and various warning/flow detection sensors.

Figure 3B:
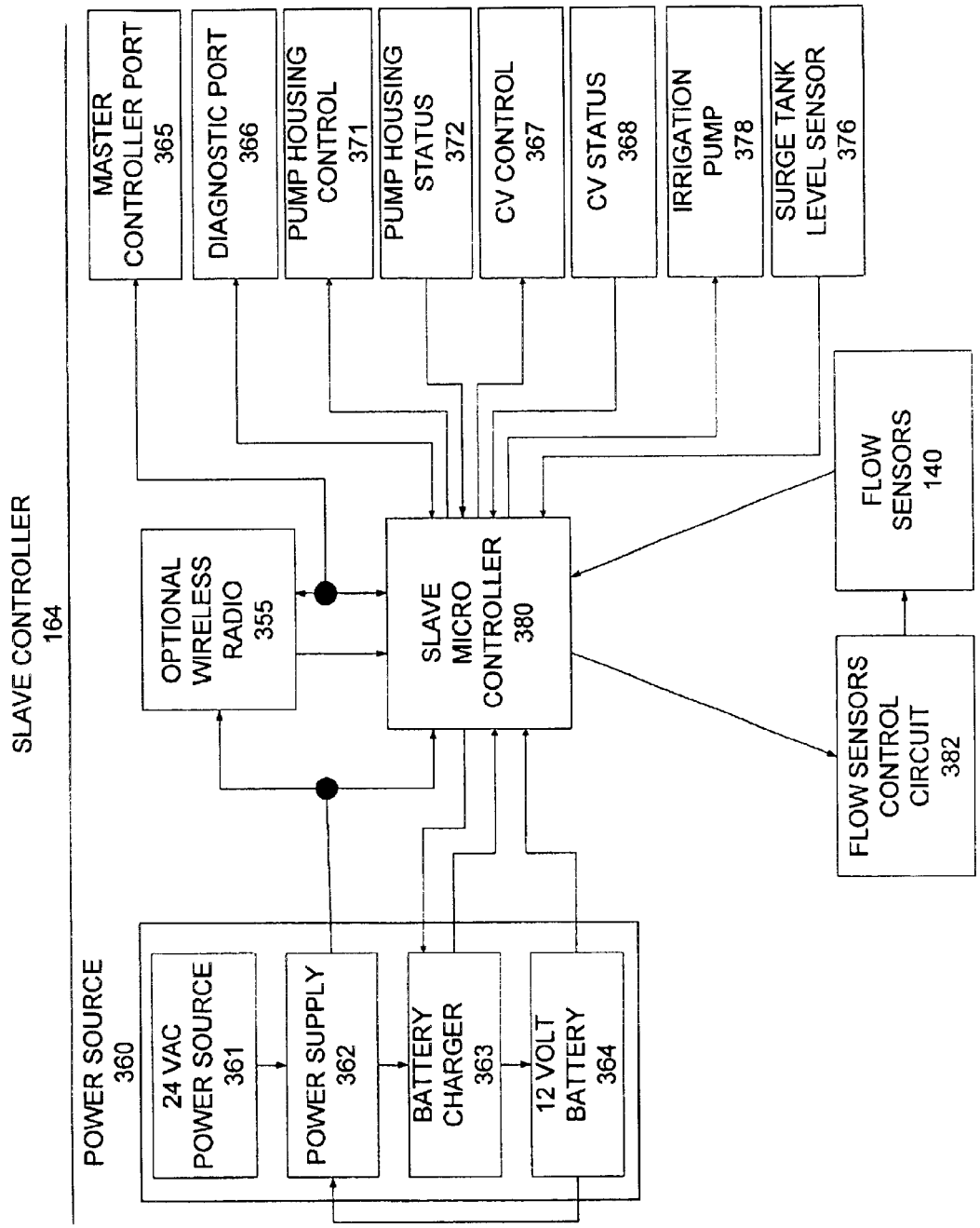
FIG. 3B illustrates one embodiment of the slave controller shown in FIG. 1.

FIG. 3B illustrates one embodiment of the slave controller 164 shown in FIG. 1. The slave controller is operable to controls sensors 144–146, and controls and/or gathers status from the collection valve 160, pump housing 182, surge/collection tank 184 water level, and filtration system 186.

The slave controller 164 includes an optional wireless radio 355 with RSSI (signal strength) output, a power supply section 360 comprising a 24 volts AC power source 361, a power supply 362 with 12 volt pump battery 364, a 12 volt battery charger 363, master controller port 365 (if connected with optically isolated cable versus wireless), a diagnostic port 367 for firmware upgrades and system calibration during installation, collection valve control/status 367 and 368, pump housing control/status 371 and 372, surge/collection tank water level detection 376, irrigation pump control 378 including back flushing of the gray water filter, and the micro-controller (uC) 380.

The optional wireless radio 355 is an attachable circuit board with a RF transceiver, support circuitry for filtering and frequency control logistics, digital control interface for programming the transceiver by the uC 380 along with controlling the transmit versus receive sections, phase lock loop status, and received signal strength indication (RSSI) output that will be read by the uC during reception of RF traffic for determination of validity. The 24 VAC wall power 361 and/or battery 364 supply the power supply 362 which produces the operating voltage used by a majority of the digital circuitry and the optional wireless radio.

The collection valve 160 is comprised of 3 flow sensor assemblies 144, 145, and 146 along with a motor to control the valve. The sensors 144-146 communicate with the slave uC 164 through the flow sensor control circuit 382 (located within the slave controller 164 in one embodiment) and sensor readings are provided back to the uC 380 (after proper A/D conversion in one embodiment). The collection valve motor control port 367 controls the valve position of the collection valve 160 and the uC 380 uses feedback status 368 to ensure that the collection valve 160 is in the correct position.

During operation in a gray water state, the collection valve 160 routes water to the pump housing 182 for initial storage and pump out. The water level is determined by a threshold switch for the pump to be turned on by the uC. The period of time that the pump is turned on will be stored in the slave controller firmware.

The surge/collection tank 184 is supplied water from the pump housing 182. The water level is read by the uC 380 from sensor 147 in the tank. The level sensor 147 will be used to determine the amount of water that is irrigated and provided to the user via the master controller user interface 365. An irrigation pump is enabled by the slave controller and the period of time is based on the level of water being reduced to a low level threshold. In one embodiment, this pump is also used to back flush the gray water filter on a periodic basis (with either gray water, or potable water provided with an optional valve). City water pressure and/or other pumps may also be used to back flush the gray water filter.

The master controller communicates with the slave controller via interface ports 330 and 365. The interface ports 330 and 365 may comprise an RF channel when the master and slave controllers are communicating wirelessly, or each may comprise an electrical or optical connection when electronic or optical signal means are used.

The diagnostic port 367 is used by the installation personnel to get flow calibration data in and out of the system, update the firmware in the flash based uC, entering sensor identity information, and general data gathering during the installation or calibration phases.

The uC 380 further includes internal Flash type memory (not shown) which is designed to be upgraded/updated in the field via the diagnostic port 367. It also has EEPROM memory to store system parameters which is non-volatile and is used by the firmware for system control. It also has an A/D converter section used for water level readings along with determining battery and pre-regulator voltage values.

Sensor Architecture and Operation

Figure 4A:
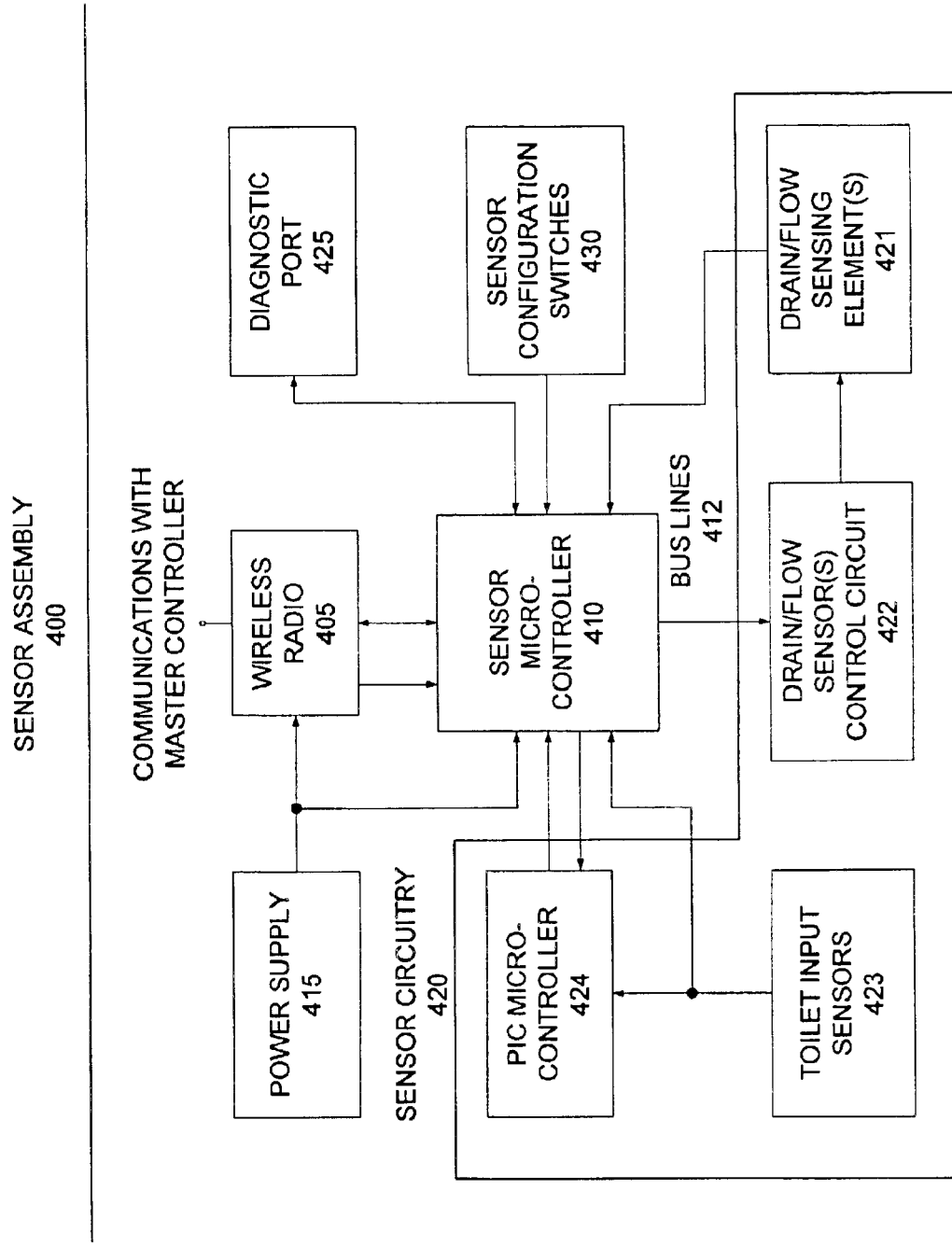
FIG. 4A illustrates one embodiment of the flow sensors shown in FIG. 1.

FIG. 4A illustrates one embodiment of the flow sensors 140 in accordance with the present invention. The sensor assembly 400 is operable to detect water flow from a monitored water source (either black or gray), and is further configured to communicate the flow event to a controller, which in turn, switches the outlet of the collection valve to the appropriate drain line.

As shown, the sensor assembly 400 includes a transceiver radio 405 ("radio" hereinafter), a sensor micro-controller 410, a power supply 415, sensor circuitry 420 including: drain/flow sensing element(s) 421 and drain/flow control circuit 422, float switch and/or turbine pulse detector 423, and a PIC micro-controller 424, a diagnostic port 425, and sensor configuration switches 430.

The radio 405 is operable to transmit signals to, and receive signals from, the controller. In a particular embodiment, the radio 405 is operable to communicate data in one or more channels over the 900 MHz ISM (Industrial/Scientific/Medical) band, and in one embodiment may be modified to additionally operate within the 300–400 MHz range as well. The radio 405 may be adapted to operate in a "frequency agile" manner in which the radio 405 and the controller synchronously change their communication frequency so as to avoid noise or interfering signals present on other channels. The radio may include digital control interface for programming the receiver In a particular embodiment, the radio 405 is an attachable circuit board with a RF transceiver, support circuitry for filtering and frequency control logistics, digital control interface for programming the transceiver by the primary uC along with controlling the transmit versus receive sections, phase lock loop status, and received signal strength indication (RSSI) output that will be read by the uC during reception of RF traffic for determination of validity.

The sensor assembly 400 further includes a sensor micro-controller 410 configured to control functions of the sensor assembly 400. In a particular embodiment, the micro-controller 410 comprises flash-based firmware which stores and runs one or more executable programs for controlling operations of the assembly 400. Control signals and/or data may be exchanged between the processor 410 and assembly components via internal bus lines 412. The micro-controller 410 may include a memory which stores the executable programs and/or sensor data obtain from the sensing elements 420. Alternatively, the executable programs and/or data may be stored in memory (volatile or non-volatile) located outside the micro-controller 410. The micro-controller 410 may be of any architecture (e.g., RISC, etc.), and run on any open, commercial, or proprietary platform (e.g., Linux, Windows, etc.). One embodiment of an algorithm for controlling the sensor circuitry 420 is present below.

The power supply 415 may comprise a battery pack or an external supply, such as AC or DC power. In a specific embodiment in which separate battery and external supplies are used, they are diode connected for isolation therebetween, allowing for the reading of the individual voltages by the sensor micro-controller 410 for system diagnostics.

Sensor circuitry 420 includes a float switch or turbine sensor 423 used to stimulate the wakeup circuit which then brings the micro-controller 410 out of sleep mode. Once the micro-controller 410 is awake, the sensor elements require consistent monitoring to determine when the flush cycle has finished. In specific embodiments, the float switch is employed in a toilet sensor 141 (further described below) and the turbine sensor can be used for battery powered kitchen sensors 142 along with some toilet sensors 141 and most soft water back flush sensors 143.

Sensor circuitry 420 further includes one or more sensing elements 421 to measure water flow, a process which is described in greater detail below. When implemented in the form of a toilet sensor, two separate sensing elements 421 are used in one embodiment to detect flow of both hot and/or cold water and to determine the ambient temperature of the toilet water being used during a flush. The ambient temperature will offset the values being read by the flow/drain element during the flush cycle. In another embodiment, two drain flow sensors may be located in a spaced apart manner to detect drain flow. In embodiments in which the sensors operate in a sleep mode to conserve power, the sensor circuitry 420 includes control circuitry 422 to provide normal power to each sensing element 421 during an active period during which measurements are taken as described below.

The sensor assembly 400 further include a diagnostic port 425 which can used by installation personnel to get flow calibration data in and out of the system, update the firmware in the micro-controller, entering sensor identity information, and general data gathering during the installation or calibration phases.

Sensor configuration switches 430 are used to program the configuration of the particular sensor consistent with its desired function and operation. For example, the settings may be used to define a sensor as either a black or gray water sensor, or define a particular sensor, such as a toilet sensor as described below. The settings may also be used to define the sensor's address, how power is to be supplied (battery or external), enablement or disablement of particular functions (e.g., sleep mode, wake-up via float or turbine, etc.)

The sensor assembly 400 may further include additional switches and indicators, such as: a reset switch used during system calibration and installation, an error clear switch for the user to tell the system that an error previously detected has been fixed (plugged toilet will be the primary use), error LED indicator, system status LED, speaker, microphone, and an A/D converter section used for sensor element readings along with determining battery and wall power DC voltage values.

Figure 4B:
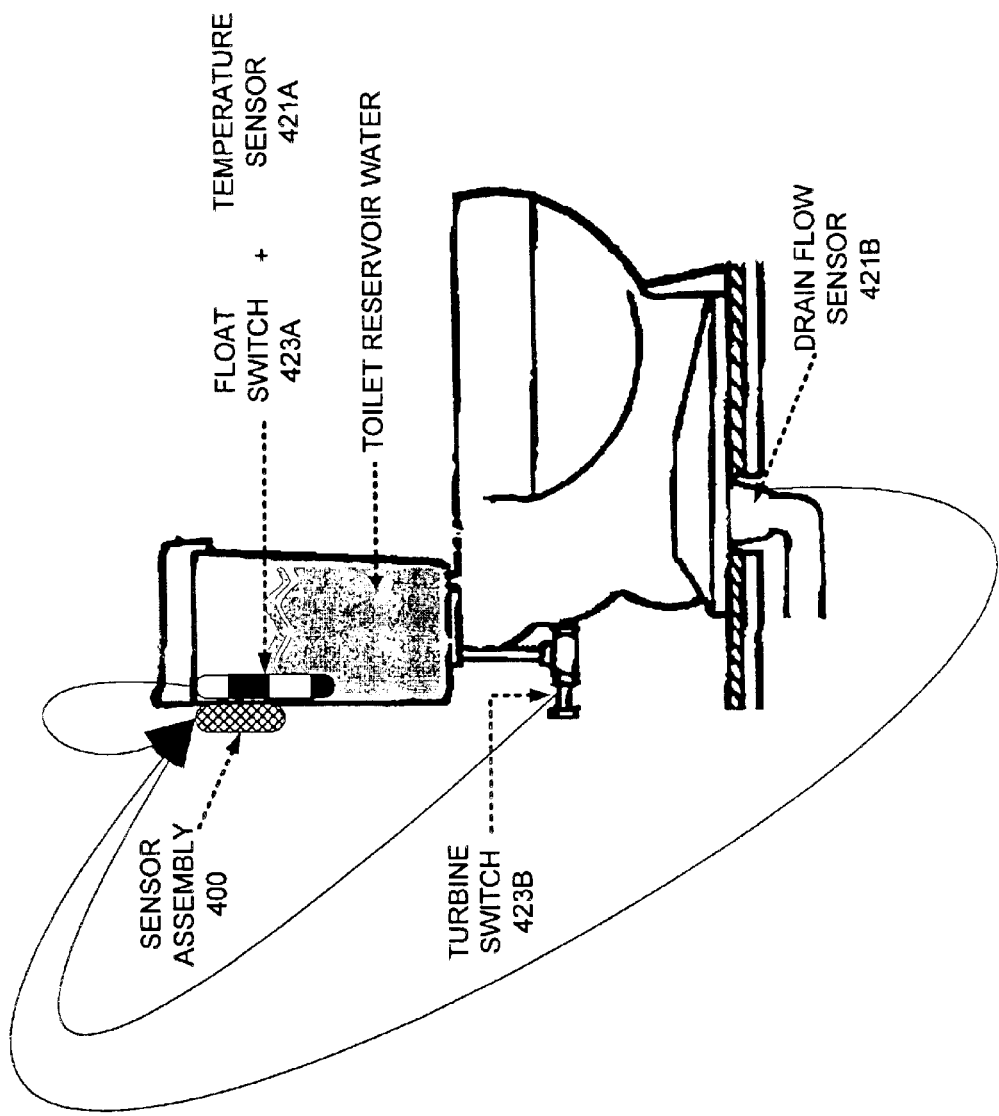
FIG. 4B illustrates one embodiment of the flow sensor comprising a toilet sensor in accordance with the present invention.

FIG. 4B illustrates one embodiment of the sensor assembly 400 comprising a toilet sensor in accordance with the present invention. The sensor components are generally as described above, albeit with some modifications as provided below.

The sensor assembly includes two sensor types: drain/flow sensor(s) 421 located on the toilet drain line, and toilet input sensors 423 comprising a float switch 423a located in the toilet reservoir and/or a turbine switch 423b located on the water intake line. The toilet input sensors 423 are configured to initially detect water flowing into the toilet reservoir, and generate a wake-up signal in response thereto. The wake-up signal is subsequently communicated (via wireless or wired means) to the sensor micro-controller 410 located within the sensor 400. The micro-controller 410 upon receiving the wake-up signal, instructs the power supply to supply power to the toilet drain sensor(s) 421, the operation of which is described below. In one possible embodiment, the float switch 423 consists of a float-actuated switch which detects a change in the water level of the toilet water reservoir. In another embodiment, the turbine switch 423b comprises a mechanical pinwheel assembly such as that described in U.S. Pat. No. 5,721,383 entitled "Flow Meter System and Method of Using Same," the contents of which are herein incorporated by reference. Other assemblies which use mechanical, electrical, optical or other means to initially sense the flow of water can be used in alternative embodiment under the present invention.

Once power is supplied to the drain/flow sensor(s) 421, the micro-controller 410 begins monitoring the response of the drain/flow sensor 421 as described below. Once the micro-controller 410 concludes that drain/flow sensor 421 has detected a black water event, then micro-controller 410 controls the radio 405 (located within sensor 400) to communicate (e.g. wirelessly broadcast in one embodiment) a signal to the master controller 162 that a black water event has been detected. The process by which the radio 405 broadcasts the message to the controller is further described below.

Once the black water event message has been transmitted, the micro-controller 410 controls the radio 405 to listen for an acknowledgement signal from the master controller 162 indicating that it has received the black water event message. If the micro-controller 162 determines that the radio 405 has not received the message after a predefined time, the micro-controller 410 will enter into a back off algorithm in which it waits to retransmit the black water event message.

In one embodiment, the drain/flow sensor(s) comprise two sensors. A first sensor 421*a* comprises a temperature sensor for monitoring the temperature of the toilet reservoir water. A second drain/flow sensor 421*b* comprises a thermistor, or equivalent component or circuit, operable to convert temperature to an electrical voltage/current. The first sensor 421*a* is operable to inform the micro-controller of the water temperature, as this will be a parameter in determining if a flush has occurred. The second drain/flow sensor 421*b* is used to detect water flow by monitoring the sensor's change in voltage over a predefined period, the change in voltage corresponding to a change in the sensor's temperature as water flows through the drain line. Specifically, the second drain/flow sensor 421*b* will exhibit a particular voltage-v-time response corresponding to the temperature change of the sensor resulting from water flow within the monitored drain line, that response being a function of the toilet water temperature which the first sensor 421*a* measures. The process by which the micro-controller interrogates sensors 421*a* and 421*b* to determine if a flush has occurred is described in greater detail below.

Figure 4C:
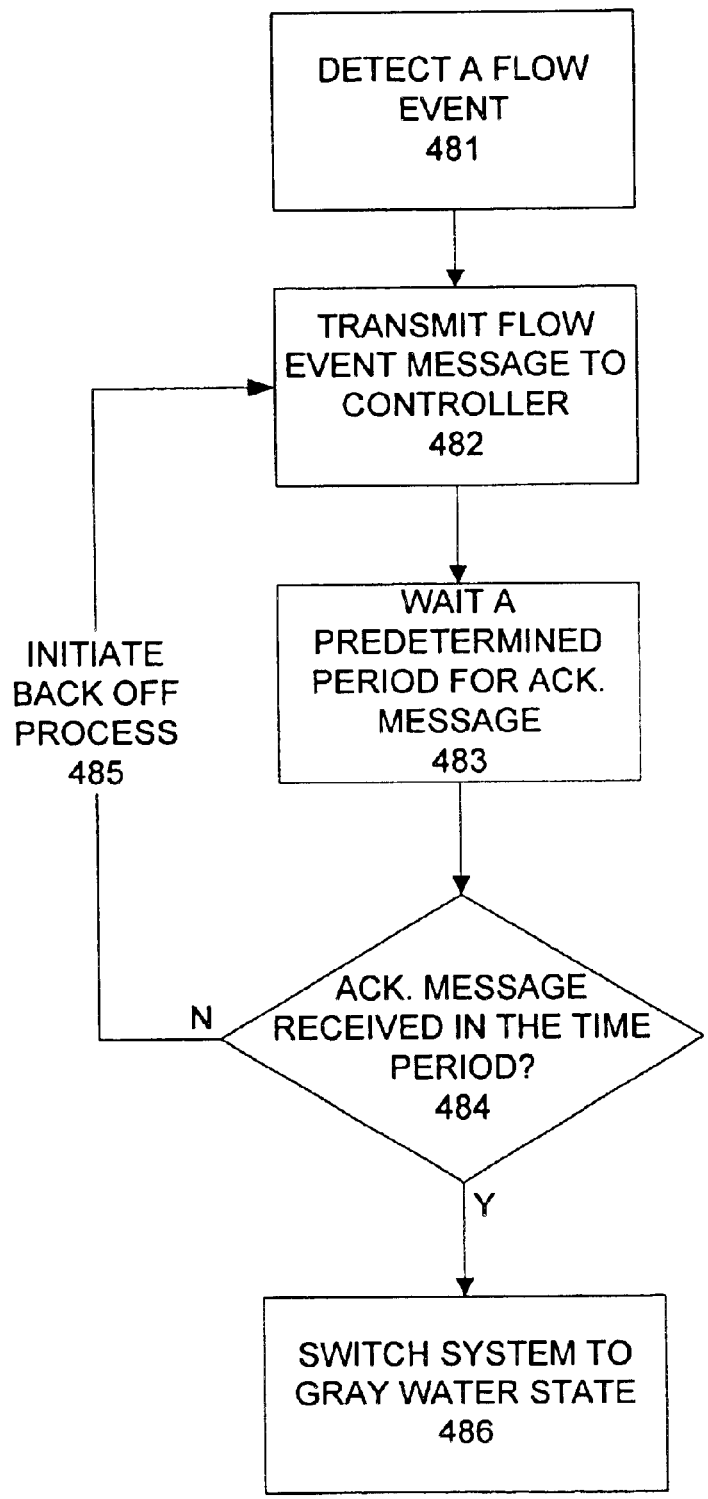
FIG. 4C illustrates a method for operating the flow sensor shown in FIG. 4A.

FIG. 4C illustrates a method for operating the sensor assembly 400 in accordance with the present invention. The method is described in terms of detecting black water flow, although the same process may be used with a gray water sensor to detect gray water flow.

Initially at 481, a flow event is detected. The process of detecting a flow event in one embodiment comprises, (i) producing a wake-up signal upon the detection of an initial flow event; (ii) supplying power to the drain/flow sensor(s) 421 and measuring a response of the flow event; and (iii) correlating the measured response to a stored response, the stored response corresponding to a known flow event. In a particular embodiment of process (ii), the micro-controller 410 obtains a measurement of the water temperature from the first sensor 421*a*, and a voltage-v-time measurement from the thermistor 421*b*. The process of (iii) then comprises the micro-controller 410 comparing the measured response with one or more baseline voltage-v-time response(s) which has been previously obtained, as will be further described below. The measured response will most closely correlate with one of the baseline responses, and the flow event associated with that closest baseline response will be determined as the current flow event.

In some embodiments, the measured and baseline responses may not correlate closely because of a difference in water temperature between the taking of the baseline and measured responses. In this instance, the micro-controller 410 uses the water temperature information to extrapolate the measured response to the water temperature of the baseline response, and a more accurate correlation can then be taken. In an alternative embodiment, the baseline voltage-v-time response can be obtained at various water temperatures and stored. In this instance upon measurement, the micro-controller 410 obtains the measured water temperature, and retrieves that set of baseline responses at that temperature which most closely approximates the measured temperature.

Next at 482, the flow event message is transmitted to the controller. As noted above, gray water sensors will transmit a "gray water event" signal, black water sensors will transmit a "black water event" signal, and sensor 144 at the inlet of the collection valve 160 will transmit a "water flow event" signal. In addition, each sensor's signal will be unique, so that the source of each signal can be ascertained.

Subsequently at 483, the sensor assembly 400 listens for the controller to transmit and acknowledgement message indicating that it has received the sensor assembly's transmission and has taken the appropriate action. If within a predefined time period an acknowledgement message has not been received (484), the sensor assembly 400 initiates a back off algorithm at 485 which schedules a retransmission of the flow event message after a predefined delay. In a particular embodiment, each of the sensors 140 schedules retransmission after different delay periods so as to minimize the possibility that sensor transmission collide when attempting to communicate with the controller. If an acknowledgement message has been received within the predefined period, the sensor assembly powers down to its sleep mode where it conserves power until a subsequent flow is initially detected.

Sensor Calibration

The present invention uses a system in which black and gray water sources drain along the same line. Accordingly, it is important to determine when a block in the drain of a black water source may have occurred, since these blockages can result in water slowly draining from the black water source to emulate a black water event occurring over an extended period of time. In the above embodiment in which the system switches collection states upon detection of a black water event, erroneously detecting the black water event will keep the system in a black water collection state, thereby reducing the system's benefit.

In order to distinguish between normal drainage and when a block may have occurred, several voltage-v-time responses can be obtained corresponding to normal drainage and varying degrees of blockage. For example, upon installation and routine maintenance of the system, the voltage-v-time responses can be determined for normal drainage, and varying degrees of blockage, e.g., 25%, 50%, 75% and 100%, the varying degrees of blockage being simulated through the use of inserts which restrict water drainage to the corresponding percentages. These responses are then stored in the micro-controller 410. As noted above, the responses can be taken at one temperature, or at several different temperatures.

Upon the fixture's subsequent use, the sensor's voltage-v-time response is measured and correlated to each of the stored voltage-v-time responses, whereupon the drain's condition is determined by which of the stored responses has the closest correlation to the measured response. Information as to the number of normal drains and blockages occurring over a period of time may be stored in the micro-controller 410 to troubleshoot the system, or to notify that the fixture may be in need of repair or replacement.

On normal drains, the measured voltage-v-time response will be closely correlated to the stored voltage-v-time normal drain response. Blockages will be more closely correlated to one of the stored voltage-v-time responses of a blocked system. In such an instance, the processor will store this result, and attempt to alert the system user or maintenance personnel that a block has occurred. The master controller 160 will be switched to the black water state until the block is cleared. In a particular embodiment, the sensor assembly 400 may include a reset button which is depressed when the blockage is cleared (e.g., the toilet or sink block is cleared). Once pressed, the sensor assembly 400 sends a signal to the master controller 162 to resume normal operation, allowing operation in the gray water state.

In an alternative embodiment in which some amount of constant drainage from the monitored source may be tolerated (for instance, a leaky kitchen faucet), either the sensor assembly 400 may be configured such that this amount of drainage does not trigger detection of a black water event, or the master controller 162 may be programmed to continue operation in the gray water mode if the detected drainage is within a predefined limit.

The foregoing calibration process can also be used to calibrate of gray water sensors having components 405, 410, 415, 420, 425, and 430 as described above. Specifically, in systems 100 configured to switch the collection state based upon detecting gray water flow, the employed gray water sensors may be configured and calibrated as described above to detect normal drainage, and varying degrees of blockage. Also as noted above, the gray water sensor assemblies and/or the master controller 162 may be configured to permit a predefine amount of drainage without triggering a gray water event and switching the state of the collection valve 160.

The foregoing description has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to hereby enable others skilled in the art to best utilize the invention in various embodiments and with various modifications as are suited to the particular use contemplated. It is intended that the scope of the invention be defined solely by the claims appended hereto.

What is claimed is:

1. A gray water collection system, comprising:
    a main drain line;
    one or more black water sources connected to the main drain line;
    one or more gray water sources connected to the main drain line; and
    a collection valve located down stream from at least one of the one or more black water sources, the collection valve having (i) an inlet connected to the main drain line, and (ii) an outlet connectable to a black water drain line or a gray water drain line, further comprising one or more gray water sensors configured to detect water flow from a respective number of the one or more gray water sources.

2. A gray water collection system, comprising:
    a main drain line;
    one or more black water sources connected to the main drain line;
    one or more gray water sources connected to the main drain line; and
    a collection valve located down stream from at least one of the one or more black water sources, the collection valve having (i) an inlet connected to the main drain line, and (ii) an outlet connectable to a black water drain line or a gray water drain line, further comprising one or more black water sensors configured to detect water flow from a respective number of the one or more black water sources.

3. The system of claim 2, wherein the one or more black water sensors communicate water flow detection to the collection valve using electrical signals.

4. The system of claim 3, wherein the one or more black water sensors communicate water flow detection to the collection valve via a wire.

5. The system of claim 4, wherein the one or more sensors communicate water flow detection to the collection valve using a wireless signal.

6. A gray water collection system, comprising:
    a main drain line;
    one or more black water sources connected to the main drain line;
    one or more gray water sources connected to the main drain line;
    one or more black water sensors configured to detect water flow from the one or more black water source, each of the one or more black water sensors comprising:
        a detector operable to detect the flow of water from the black water source; and
        a transmitter for transmitting a black water event signal when black water flow is detected; and
    a collection valve having (i) an inlet connected to the main drain line, (ii) an outlet connectable to a black water drain line or a gray water drain line, and (iii) a signal input for receiving the black water event signal from the one or more black water sensors;
    wherein, responsive to the reception of the black water event signal, the outlet of the collection valve switches to, or remains connected to, the black water drain line.

7. The system of claim 6, wherein the collection valve is located downstream from the one or more black water sources.

8. The system of claim 6, wherein the one or more black water sensors communicate the black water event signal via an electrical signal.

9. The system of claim 8, wherein the electrical signal is sent via a wire.

10. The system of claim 8, wherein the electrical signal comprises a wireless signal.

11. The system of claim 6, further comprising:
    a collection valve sensor, comprising:
        a detector configured to detect water flow at the inlet of the collection valve; and
        a transmitter operable to transmit a water flow event signal upon detection of water flow into the collection valve,
    wherein, responsive to the reception of the water flow event signal, and wherein a black water event signal has not been received, the outlet of the collection valve switches to, or remains connected to, the gray water drain line.

12. The system of claim 6, wherein the collection valve sensor communicates the water flow signal via an electrical signal.

13. The system of claim 12, wherein the electrical signal is sent via a wire.

14. The system of claim 12, wherein the electrical signal comprises a wireless signal.

15. The system of claim 6, further comprising one or more gray water sensors configured to detect water flow from the one or more gray water sources, each of the one or more gray water sensors comprising:

a detector operable to detect the flow of water from the gray water source; and a transmitter for transmitting a gray water event signal when gray water flow is detected, wherein, responsive to the reception of the gray water event signal, and wherein a black water event signal has not been received, the outlet of the collection valve switches to, or remains connected to, the gray water drain line.

16. The system of claim 15, wherein each of the one or more gray water sensors communicates the gray water event signal via an electrical signal.

17. The system of claim 16, wherein the electrical signal is sent via a wire.

18. The system of claim 16, wherein the electrical signal comprises a wireless signal.

* * * * *